United States Patent [19]
Kuo

[11] Patent Number: 5,573,664
[45] Date of Patent: Nov. 12, 1996

[54] WATER MAGNETIZATION APPARATUS HAVING INSERTABLE MAGNETIZING UNIT

[76] Inventor: Dai-Ming Kuo, C/O Hung Hsing Patent Service Center P.O. Box 55-1670, Taipei, Taiwan

[21] Appl. No.: 488,751

[22] Filed: Jun. 5, 1995

[51] Int. Cl.[6] .................................................. C02F 1/48
[52] U.S. Cl. ............................. 210/222; 210/251
[58] Field of Search ..................... 20/222, 695, 251; 239/525, DIG. 11

[56] References Cited

U.S. PATENT DOCUMENTS 4,988,618  1/1991  Li et al. ............................. 210/222

FOREIGN PATENT DOCUMENTS 62-234589  10/1987  Japan ............................. 210/222

Primary Examiner—Matthew O. Savage

[57] ABSTRACT

A water magnetization apparatus includes: an insertable magnetizing unit secured in a magnetization holder such as a magnetizing shower or a water-magnetization pipe of a water treatment system, with the insertable magnetizing unit including a magnet-carrying member made of non-magnetic material, a plurality of water through holes and magnet sockets longitudinally juxtapositionally formed through the magnet-carrying member to form an array arrangement from a cross sectional view of the magnet-carrying member, and a plurality of magnets respectively embedded in the plurality of magnet sockets recessed in the magnet-carrying member, each water through hole sandwiched in between every two adjacent magnets having opposite magnetic poles of the two adjacent magnets facing each other for magnetizing a water stream flowing through each water through hole as subjected to a magnetic field between the two adjacent magnets, thereby forming a water magnetization apparatus having dense distribution of magnets for increasing a water-magnetizing effect.

3 Claims, 3 Drawing Sheets

WATER MAGNETIZATION APPARATUS HAVING INSERTABLE MAGNETIZING UNIT

BACKGROUND OF THE INVENTION

John D. Corney disclosed a magnetic fluid-conditioning tool in his U.S. Pat. No. 5,178,757 by mounting magnets (15) on a flux-coupling cover member (33), with the flux-coupling cover member (33) mounted on each part (17a, 17b) of a core assembly (17). The two parts (17a, 17b) of the core assembly are then secured together by welding to form a flow passage (19) therebetween in the hollow tube (13). Each magnet (15) should be carefully secured on the flux-coupling cover member (33) and the two parts (17a, 17b) of the core assembly (17) should be welded together, thereby increasing the assembly complexity and production cost thereof.

SUMMARY OF THE INVENTION

The object of the present invention is to provide a water magnetization apparatus including: an insertable magnetizing unit secured in a magnetization holder such as a magnetizing shower or a water-magnetization pipe of a water treatment system, with the insertable magnetizing unit including a magnet-carrying member made of non-magnetic material, a plurality of water through holes and magnet sockets longitudinally juxtapositionally formed through the magnet-carrying member to form an array arrangement from a cross sectional view of the magnet-carrying member, and a plurality of magnets respectively embedded in the plurality of magnet sockets recessed in the magnet-carrying member, each water through hole sandwiched in between every two adjacent magnets having opposite magnetic poles of the two adjacent magnets facing each other for magnetizing a water stream flowing through each water through hole as subjected to a magnetic field between the two adjacent magnets, thereby forming a water magnetization apparatus having dense distribution of magnets for increasing a water-magnetizing effect.

DETAILED DESCRIPTION

Figures 1, 1A:
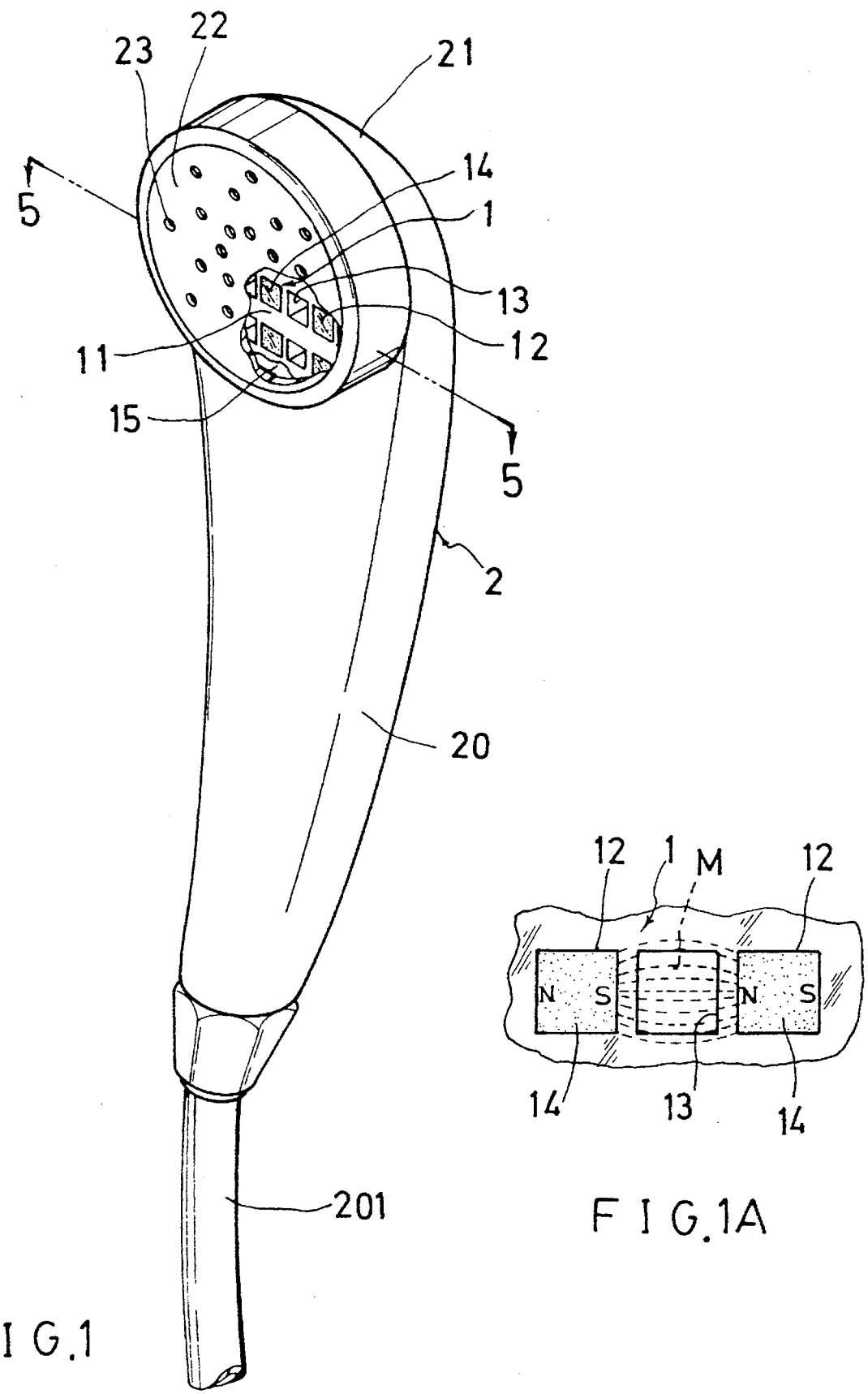
FIG. 1 is a perspective view of the present invention serving as a shower.
FIG. 1A is a partial illustration showing a magnetic field formed by the present invention.
Figure 2:
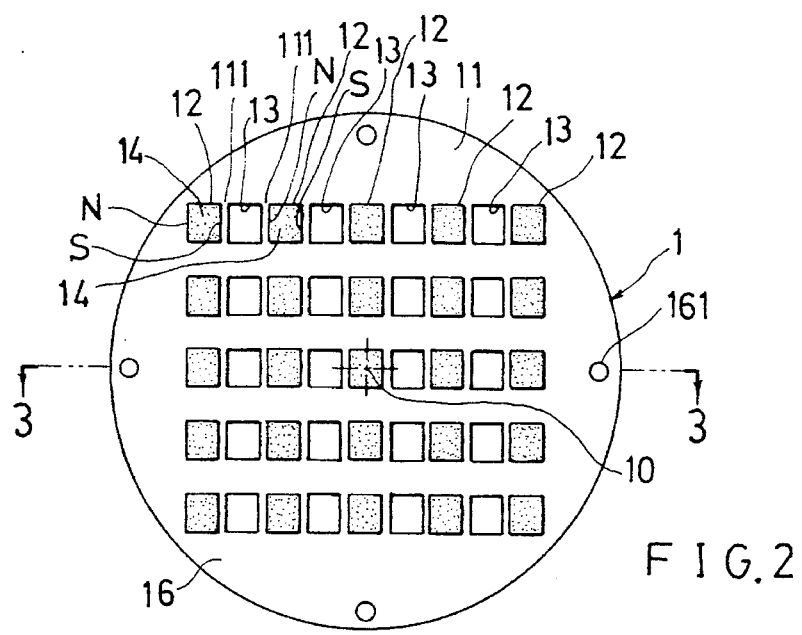
FIG. 2 is an illustration showing an array of the plural magnets and water through holes in the magnetizing unit from a cross sectional view of the present invention.

As shown in FIGS. 1–5, the present invention comprises: an insertable magnetizing unit 1, and a magnetization holding means 2 which may be a shower as shown in FIG. 1.

Figure 3:
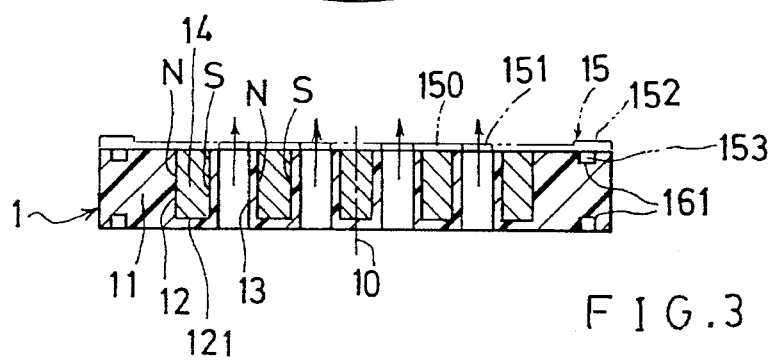
FIG. 3 is a sectional drawing of the magnetizing unit when viewed from 3—3 direction of FIG. 2.
Figure 4:
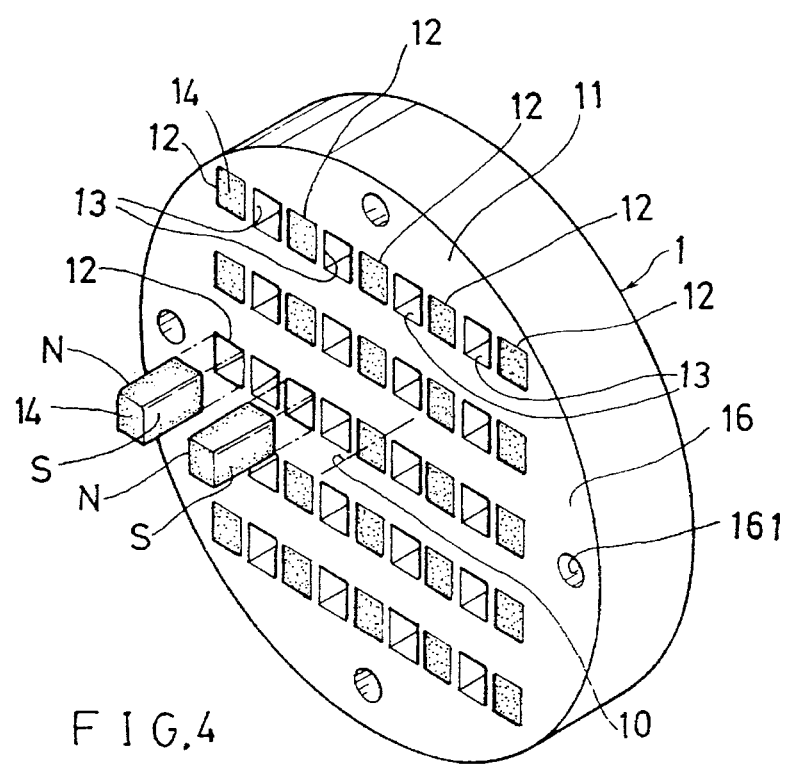
FIG. 4 is a perspective view of the magnetizing unit of the present invention.
Figure 5:
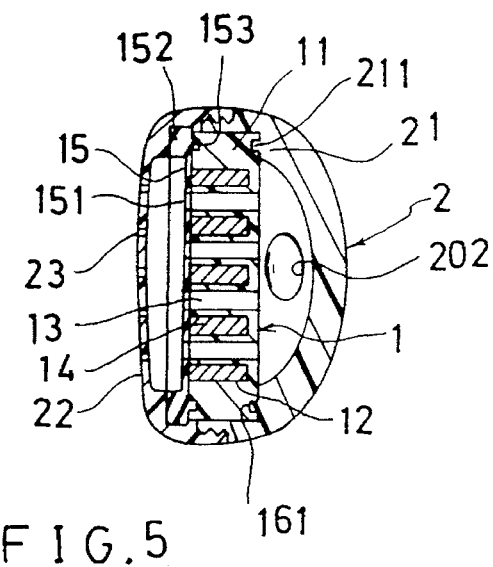
FIG. 5 is a sectional drawing of the present invention when viewed from 5—5 direction of FIG. 1.

The insertable magnetizing unit 1 includes: a magnet-carrying member 11 which may be formed as a cylindrical shape or other shapes and made of non-magnetic material such as plastic material and penetratable by magnetic field (M), a longitudinal axis 10 existing at a longitudinal center of the magnet-carrying member 11, a plurality of magnet sockets 12 longitudinally juxtapositionally recessed in the magnet-carrying member 11 to be parallel to the longitudinal axis 10 each magnet socket 12 having a closed bottom portion 121 formed at an end wall of the magnet-carrying member 11 for seating each magnet 14 inserted in each magnet socket 12, a plurality of water through holes 13 longitudinally juxtapositionally formed through the magnet-carrying member 11 each water through hole 13 sandwiched in between every two adjacent magnets 14 having opposite magnetic poles (such as N, S poles) of the two adjacent magnets 14 facing each other for magnetizing a water stream flowing through each water through hole 13 as subjected to a magnetic field M between the two magnets 15 having opposite magnetic poles as shown in FIG. 1A and each water through hole 13 separating from each magnet socket 12 by a thin partition wall 111, a packing cover 15 as shown in FIGS. 3, 5 having a plurality of holes 151 formed in the cover 15 corresponding to the water through holes 13 for passing water streams therethrough and having the remaining cover portion 150 sealing the magnets 15 in the magnet sockets 12, and at least a coupling portion 16 formed on a periphery of the magnet-carrying member 11 for connecting the magnetization holding means 2.

The magnetization holding means 2 may be a shower and includes: a handle portion 20 connected with a water hose 201 to deliver a water stream through a water opening 202 formed in the handle 20, a shower head 21 formed at a top portion of the handle 20 and having a plurality of protrusions 211 to engage a plurality of recesses 161 formed in an inner side of the coupling portion 16 of the magnet-carrying member 11 (FIG. 5), a nozzle cap 22 secured with the shower head 21 to fasten the packing cover 15 in between the nozzle cap 22 and the magnet-carrying member 11, and a plurality of perforations 23 formed in the cap 22 for spraying water outwardly through the water through holes 13 in the magnetizing unit 1 and the water opening 202 in the magnetization holding means 2.

The packing cover 15 includes: a packing ring 152 annularly formed on a perimeter of the packing cover 15 to be sandwiched in between the nozzle cap 22 and the magnet-carrying member 11, and a plurality of packing protrusions 153 on the packing cover 15 to be engaged with a plurality of recesses 161 recessed in an outer side of the coupling portion 16 of the magnet-carrying member 11 for stably holding the packing cover 15 in the nozzle cap 22 and the magnet-carrying member 11.

Figure 6:
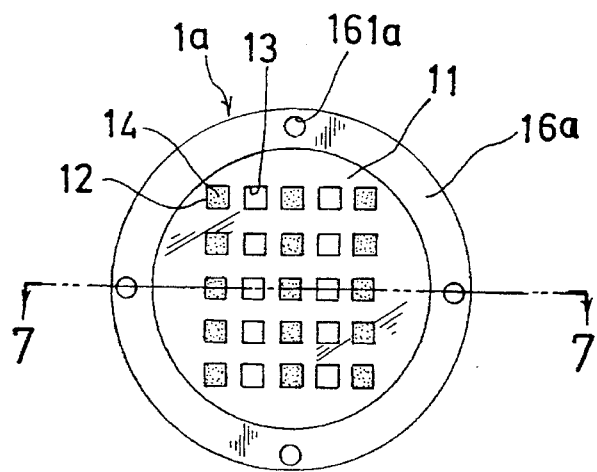
FIG. 6 is an illustration of another preferred magnetizing unit when used in a magnetization pipe in accordance with the present invention.
Figure 7:
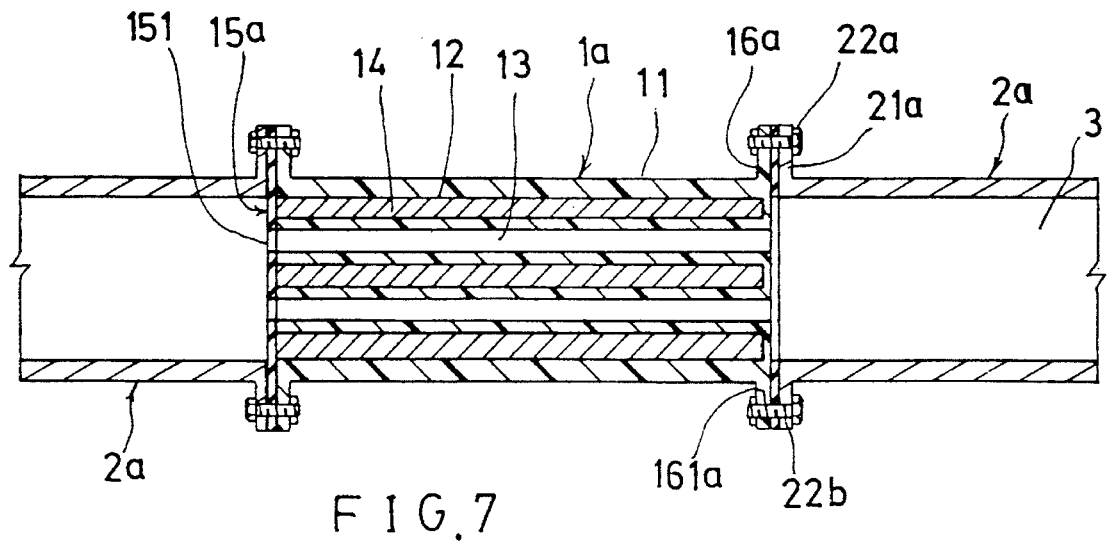
FIG. 7 is a longitudinal sectional drawing of the present invention when viewed from 7—7 direction of FIG. 6.

As shown in FIGS. 6, 7, the insertable magnetizing unit 1a may be a magnetizing pipe and the magnetization holding means 2a may be a pair of pipe sections 2a disposed on two opposite end portions of the magnetizing pipe 1a for inserting a filtering or sterilizing medium 3 in either pipe section 2a or for connecting a water treatment system (not shown), and the magnetizing pipe includes: a pair of flanges 16a formed on two opposite end portions of the magnetizing pipe 1a, each flange 16a having bolt holes 161a formed therein and secured to each connecting flange 21a of a pipe section 2a by fixing bolts 22a through the bolt holes 161a in the flange 16a and through the holes 22b in the flange 21a, with a packing cover 15a packed between the two flanges 16a, 21a.

The magnetizing unit 1, 1a of the present invention may be used for water cleaning, flushing, treatment and drinking purposes, not limited in this invention.

Since the plurality of magnets 14 and the water through holes 13 are formed as an array having a plurality of rows and columns arranged by the magnets 14 and the water through holes 13, the plural water streams passing through the plural through holes 13 will be efficiently magnetized.

Meanwhile, each magnet 14 may be easily inserted into or dismantled from each magnet socket 12 for an easier assembly for decreasing production cost, or for a better maintenance for the magnetizing unit 1.

The present invention may be modified without departing from the spirit and scope of this invention.

I claim:

1. A water magnetization apparatus comprising:

a magnet-carrying member made of non-magnetic material having a longitudinal axis at a longitudinal center of the magnet-carrying member and first and second ends spaced apart along said longitudinal axis, a plurality of water through holes and magnet sockets longitudinally and juxtapositionally formed through said magnet carrying member to form an array consisting of a plurality of rows and columns of said water through holes and said magnet sockets as viewed from said first and second ends of said magnet-carrying member, said plurality of magnet sockets and said plurality of water through holes formed in the magnet member being parallel to the longitudinal axis, each of said water through holes extending through said first and second ends, each said magnet socket being open at said first end and having a closed bottom portion formed at the second of the magnet-carrying member for seating a magnet inserted in each said magnet socket;

a plurality of magnets respectively secured in said magnet sockets with each said water through hole sandwiched between every two adjacent magnets, each of said two adjacent magnets having two opposite magnetic poles facing each other and facing the respective water through hole sandwiched therebetween for magnetizing a water stream flowing through a respective said water through hole;

a packing cover on the first end of the magnet-carrying member having a plurality of holes formed in the cover corresponding to the water through holes for passing water streams through and having the remaining cover portion covering the magnets in the magnet sockets;

a coupling portion formed on said second end of the magnet-carrying member;

a handle connected with a water hose to deliver a water stream through a water opening formed in the handle;

a shower head formed on the handle and having a plurality of protrusions to engage a plurality of recesses formed in an inner portion of the coupling portion of the magnet-carrying member;

a nozzle cap formed with perforations therein and secured with the shower head to fasten the packing cover in between the nozzle cap and the magnet carrying member, the perforations in said nozzle cap communicating with said water through holes in the magnetizing unit and communicated with the water opening in the handle of the holding means for spraying the water outwardly.

2. A water magnetization apparatus according to claim 1, wherein said packing cover includes a packing ring annularly formed on a perimeter of the packing cover to be sandwiched in between the nozzle cap and the first end of magnet-carrying member, and a plurality of packing protrusions formed on the packing ring to be engaged with a plurality of recesses recessed in an outer portion of the coupling portion of the magnet carrying member for stably holding the packing cover in between the nozzle cap and the magnet-carrying member.

3. A water magnetization apparatus comprising:

a magnet-carrying member made of non-magnetic material having a longitudinal axis at a longitudinal center of the magnet-carrying member and first and second ends spaced apart along said longitudinal axis, a plurality of water through holes and magnet sockets longitudinally and juxtapositionally formed through said magnet carrying member to form an array consisting of a plurality of rows and columns of said water through holes and said magnet sockets as viewed from said first and second ends of said magnet-carrying member, said plurality of magnet sockets and said plurality of water through holes formed in the magnet member being parallel to the longitudinal axis, each of said water through holes extending through said first and second ends, each said magnet socket being open at said first end and having a closed bottom portion formed at the second of the magnet-carrying member for seating a magnet inserted in each said magnet socket;

a plurality of magnets respectively secured in said magnet sockets with each said water through hole sandwiched between every two adjacent magnets, each of said two adjacent magnets having two opposite magnetic poles facing each other and facing the respective water through hole sandwiched therebetween for magnetizing a water stream flowing through a respective said water through hole;

a coupling portion formed on a periphery of each of said first and second ends of the magnet-carrying member;

a packing cover on the first end of the magnet-carrying member having a plurality of holes formed in the cover corresponding to the water through holes for passing water streams through and having the remaining cover portion covering the magnets in the magnet sockets;

a first pipe section having an open end coupled to said first end of the magnet carrying member for directing water into or out of said water through holes;

a second pipe section having an open end coupled to said second end of the magnet carrying member for directing water into or out of said water through holes;

first coupling means for coupling the end of said first pipe section to a periphery of said first end of said magnet carrying member; and second coupling means for coupling the end of said second pipe section to a periphery of said second end of said magnet carrying member.

\* \* \* \* \*